United States Patent [19]

Utsumi

[11] 4,277,880
[45] Jul. 14, 1981

[54] TRACING MILLING MACHINE WITH AN AUTOMATIC TOOL CHANGER

[75] Inventor: Keizo Utsumi, Kanagawa, Japan

[73] Assignee: Makino Milling Machine Co., Ltd., Tokyo, Japan

[21] Appl. No.: 62,285

[22] Filed: Jul. 31, 1979

[30] Foreign Application Priority Data

Aug. 5, 1978 [JP] Japan ............................ 53/95026

[51] Int. Cl.³ .................... B23Q 3/157; B23Q 35/121
[52] U.S. Cl. ........................................ 29/568; 409/99
[58] Field of Search .................... 29/568; 409/98, 99, 409/94

[56] References Cited

U.S. PATENT DOCUMENTS

| 2,511,956 | 6/1950 | Wetzel | 409/99 |
|---|---|---|---|
| 3,636,814 | 1/1972 | Esch | 409/218 |
| 3,949,462 | 4/1976 | de Caussin | 29/568 |
| 4,018,113 | 4/1977 | Blazenin et al. | 409/218 |

FOREIGN PATENT DOCUMENTS 2739533  8/1979  Fed. Rep. of Germany ............ 29/568

*Primary Examiner*—Z. R. Bilinsky
*Attorney, Agent, or Firm*—McAulay, Fields, Fisher, Goldstein & Nissen

[57] ABSTRACT

A tracing milling machine is provided with an automatic tool changer, for enabling an automatic tool change of a cutting tool attached to a spindle of the machine, and an adjusting means, for adjusting a positional relationship between each cutting tool attached to the spindle and a tracer of the machine for tracing a production model whenever the automatic tool change is carried out. The positional relationship is always kept constant during the entire course of the tracing milling of a product from a workpiece.

15 Claims, 3 Drawing Figures

TRACING MILLING MACHINE WITH AN AUTOMATIC TOOL CHANGER

FIELD OF THE INVENTION

The present invention relates, generally, to an improvement in a tracing milling machine and, more particularly, the present invention relates to a tracing milling machine with an automatic tool changer, whereby machining of a product having a complicated shape, such as a male or female metal mold, can be carried out with high accuracy and at a high production efficiency. The present invention also relates to the method of operation of a tracing milling machine with an automatic tool changer, in which method an adjustment of a positional relationship between a cutting tool and a tracer is automatically accomplished every time the tool changing operation is carried out.

BACKGROUND OF THE INVENTION

It is known to use a tracing milling machine for machining a metallic product having a complicated shape, such as a male metal mold and a female metal mold. The tracing milling machine is always provided with a tracer head to which a tracer with a stylus is attached. The tracer performs a tracing movement over a surface of a model, and in response to the tracing movement of the tracer, a servo movement of a cutting tool for carrying out the machining of the metal product from a workpiece is controlled. The cutting tool attached to a spindle of the tracing milling machine has a predetermined tool radius and a predetermined tool length, although actual values of the tool radius and length may vary from the predetermined values, respectively, within a production tolerance of the cutting tool. When the machining of the metal product from a workpiece is completed, the metal product is shaped in the same or similar shape as that of the traced model.

It is well understood that the machining of a metal mold having a complicated male or female shape usually takes long machining time and, also, that the amount of metal chips cut from a workpiece during the machining process is very great. Accordingly, during the machining process of a metal mould from a workpiece thereof, it is always necessary to exchange a used cutting tool attached to the spindle head for a fresh cutting tool. Further, when a cutting tool attached to the spindle head is broken, such broken cutting tool must be exchanged for a fresh cutting tool. However, no conventional tracing milling machine is provided with a so-called automatic tool changer which enables an automatic tool change during the machining process of a metal product from a workpiece. This is because the employment of a known automatic tool changer by a conventional fully automated machining center for the conventional tracing milling machine causes one non-neglectable inconvenience from the point of view of achieving accurate machining of a metal product which must have precisely the same shape as that of a tracing model. In this regard, in the conventional tracing milling machine, control of the horizontal movement of a work table, on which the workpiece and the model are fixedly mounted, in the X-axis and Y-axis directions as well as control of the associated vertical movements of a tracer head and the spindle head to which a cutting tool is attached in the Z-axis direction are performed in response to the tracing movement of a tracer over the surface of the model, whereby the cutting tool applies a cutting motion to the workpiece on the work table so that the workpiece is shaped into the same shape as that of the model. Therefore, it is inevitably necessary that a predetermined positional relationship between the cutting tool and the tracer be always maintained constant over the entire course of the machining process of a workpiece. Otherwise, no accurate machining of a metal product having the same shape and dimensions as those of the model can be achieved by the tracing milling machine. For this reason, at the initial stage of the machining process of the tracing milling machine, the model and the workpiece are firstly fixed to the work table of the tracing milling machine in such a manner that a predetermined distance is established between the centers of both the model and workpiece. Subsequently, the tracer head and the spindle head are adjusted to that the distance between the axes of the tracer head and the spindle head corresponds to the predetermined distance between the centers of the model and workpiece. Thereafter, the tracer and a cutting tool are attached to the tracer head and the spindle head, respectively, so that the aforementioned predetermined positional relationship between the tracer and the cutting tool is established. After the establishment of the predetermined positional relationship, an actual cutting process of the tracing milling machine is commenced. However, during the cutting process, if the tool changing operation is performed so that the used cutting tool attached to the spindle head is replaced with a fresh cutting tool, the predetermined positional relationship between the tracer and the used cutting tool is often broken, since the tool data of the fresh cutting tool, i.e. the radius and the length of the tool, are usually different from the data of the used cutting tool.

On the other hand, in the machining process of the tracing milling machine, if an automatic tool change could be effected during the process of machining a workpiece, the entire process of the tracing machining of the workpiece, ranging from an initial rough cutting process to a final finish cutting process, could be automatically and successively carried out at a high production efficiency. Accordingly, it is strongly desired that tracing milling machines be provided with appropriate means for automatically changing a tool as well as for effectively establishing a predetermined positional relationship between the tracer and a cutting tool whenever one cutting tool is exchanged for another cutting tool.

SUMMARY OF THE INVENTION

An object of the present invention is to improve the conventional tracing milling machine so as to satisfy the above-mentioned strong desire.

Another object of the present invention to provide a novel tracing milling machine provided with both means for automatically changing a cutting tool in the course of the machining process of a workpiece, and means for establishing a predetermined positional relationship between the tracer and a cutting tool every time an automatic tool changing operation is effected by the automatic tool change means, whereby the entire course of machining of the workpiece, ranging from a rough cutting process to a final finish cutting process, can be successively carried out at a high production efficiency.

A further object of the present invention is to provide a novel method of operation of a tracing milling machine with an automatic tool changer, in which method an accurate adjustment of a predetermined positional relationship between the tracer of the tracing milling machine and a cutting tool attached to the spindle head of the tracing milling machine can be effected every time the automatic tool changer carries out the tool changing operation.

BRIEF DESCRIPTION OF DRAWINGS

The above and other objects and features of the present invention will be apparent from the ensuing description of embodiments with reference to the accompanying drawings, wherein:

Referring to FIG. 1, which schematically illustrates a tracing milling machine embodying the method of operation according to one aspect of the present invention, reference numeral 10 generally designates a tracing milling machine with an automatic tool changer. The machine 10 is provided with a generally vertical machine body 11 and a horizontal work table 17. The machine body 11 is provided with a spindle head 23 and an arm 24, which are movable together up and down along a vertical column 25 in response to a forward and a reverse drive of a vertical feed motor 22. The spindle head 23 has a spindle 12 to which one of the cutting tools ($T_o$ through $T_n$) is attached, the spindle 12 being vertically slidable in a quill 13. The spindle 12 can be clamped after adjusting the vertical position of the spindle 12 with respect to the quill 13 and, after clamping, the spindle 12 can be rotated at a desired rotational speed by a spindle drive motor 14, which receives a drive signal from a controller 15. The spindle 12 can be gradually slid by the manual operation of a handle 21 or the automatic drive of a drive motor 16, such as a stepping motor. Therefore, it is possible to effect the vertical positioning of a cutting tool $T_o$ (or one of the tools $T_1$ through $T_n$) which is attached to the spindle 12 with respect to a workpiece W mounted on the work table 17. On the work table 17, the workpiece W and a model M are mounted in a clamped state, respectively. The work table 17 having thereon the workpiece W and the model M is horizontally movable in the X-axis direction and the Y-axis direction, and is also vertically movable in the Z-axis direction. The work table 17 is moved in the X-axis, Y-axis and Z-axis directions by a drive motor assembly 18 (including X-axis, Y-axis and Z-axis motors), which receives a drive servo signal from a conventional tracing controller 51. During the movement of the work table 17 in the X-axis, Y-axis and Z-axis directions, the positions of the work table 17 along these three axes are detected by a position detector assembly 19, and the detected signals are supplied to a tracing milling machine controller 52, which will be described hereinafter.

Figure 1:
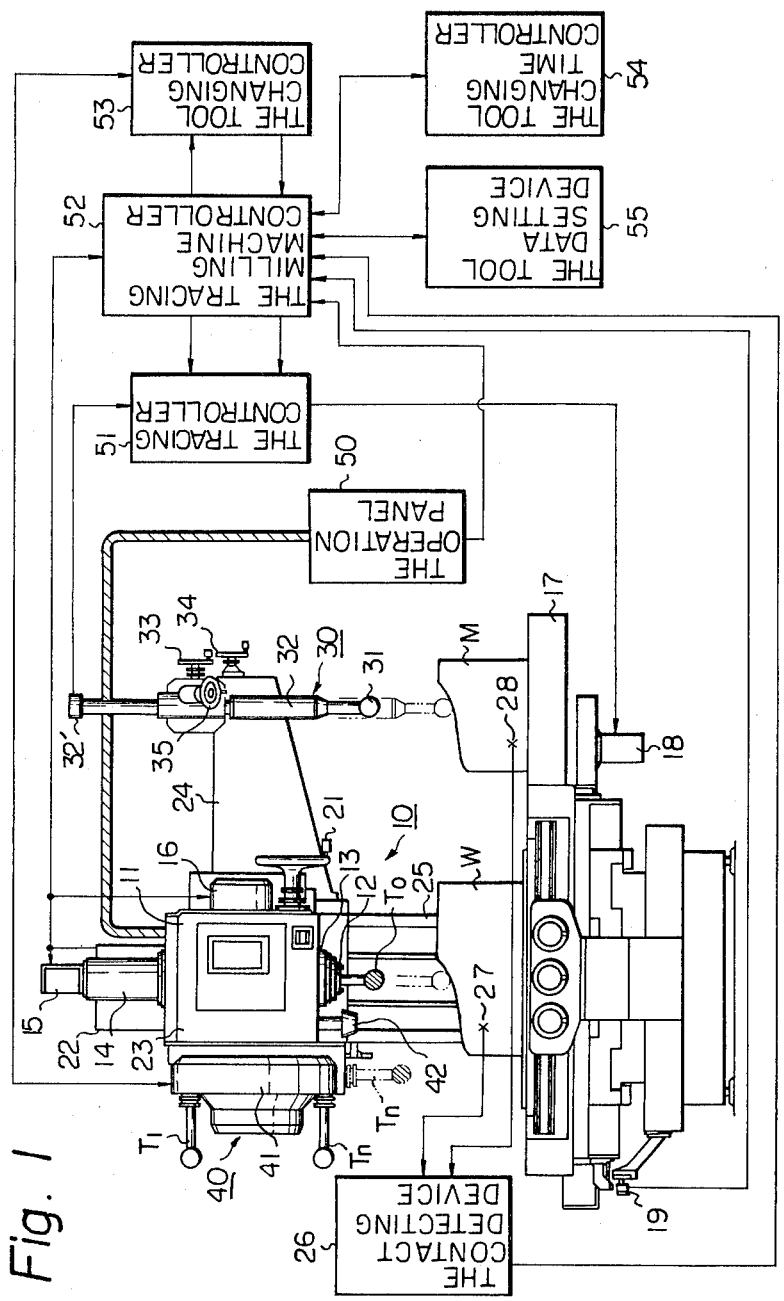
FIG. 1 is a schematic block diagram of a tracing milling machine with an automatic tool changer, according to an embodiment of the present invention.

Reference numeral 30 designates a tracer portion which is supported by the above-mentioned arm 24 and operates so as to effect the tracing movement of the surface of the model M mounted on the work table 17. The tracer portion 30 includes a tracer 31 having a stylus capable of performing a tracing movement over the tracing surface of the model M and a tracer head 32 which generates an electric signal indicative of the amount of the tracing movement of the tracer 31. The stylus of the tracer 31 usually consists of a spherical-shape stylus capable of displacing perpendicular to a surface over which the spherical-shape stylus moves. The electrical signal generated by the tracer head 32 is transmitted to the tracing controller 51. More specifically, in the tracing milling machine 10, while the tracer 31 of the tracer portion 30 traces over the tracing surface of the model M, the tracer head 32 operates so as to detect a vector amount of the tracing movement or the displacement of the tracer 31 with respect to a predetermined amount of displacement of the tracer 31, i.e. a reference amount ($E_o$) of displacement of the tracer 31 which is a set value or a reference value for a servo control of the tracing movement of the tracer portion 30 with respect to the model M. The detected vector amount of displacement of the tracer 31 is transformed into an electrical signal and is transmitted to the tracing controller 51. Thus, the controller 51 sends to the drive motor assembly 18 a drive servo signal in response to the transmitted electrical signal. As a result, a servo movement of the work table 17 is caused in the X-axis, Y-axis and Z-axis directions in response to the shape of the model M. During the servo movement of the work table 17, the cutting tool $T_o$ (or one of the cutting tools $T_1$ through $T_n$) attached to the spindle 12 provides a cutting effect for the workpiece W on the worktable 17. Consequently, the workpiece W is shaped as a product having the same shape as the model M. It should be noted that each cutting tool ($T_o$ through $T_n$) always has the same shape as the stylus of the tracer 31 and generally has a smaller dimensional value than the stylus, so that when each cutting tool comes into contact with the workpiece W, the stylus of the tracer 31 is already in contact with the model M and displaced from the non-contact state thereof by a given amount of displacement. That is to say, when each cutting tool comes into contact with the workpiece W, the tracer head 32 of the tracer portion 30 has started to generate an electrical signal indicating that the stylus of the tracer 31 is displaced by the above-mentioned given amount of displacement. Further, the distance between the axis of the tracer portion 30 and the axis of the spindle 12 is adjusted so as to correctly correspond to the distance between a predetermined center of the model M and a predetermined center of the workpiece W, by the manual operation of handles 33 and 34. Further, in the vertical feed direction, each cutting tool attached to the spindle 12 and the stylus of the tracer 31 are so adjusted by a handle 35 that both can simultaneously contact predetermined positions of the workpiece W and the model M. At this stage, the displacement signal generated by the tracer portion 30 is transformed into a corresponding electrical signal by the tracer head 32 and is in turn transmitted to the tracing controller 51 via a transmitter 32'. Therefore, the controller 51 carries out a servo control of the tracer 31 so that the vector amount of displacement of the tracer 31 with respect to the reference amount ($E_o$) of displacement of the tracer 31 is eventually eliminated. Reference numeral 50 designates an operation panel by means of which an operator is able to control the tracing movement of the tracer 31 over the tracing surface of the model M. More specifically, the operation panel is used for manually performing the control operations including setting of a desired tracing mode into the tracing milling machine, impression of a command signal indicating an approach of the tracer 31 to the model M or a withdrawal of the tracer 31 from the model M, and impression of a command signal indicating starting or stopping of the operation of the spindle 12. The signals generated by and issued from the operation panel 50 are supplied to the tracing milling machine controller 52. In these signals from the panel 50, the signal indicating the setting of a desired tracing mode, and the approach and withdrawal signals are further passed to the tracing controller 51. The tracing milling machine controller 52 is a central control portion of the tracing milling machine 10, and through this controller 52 electric power is supplied to the various drive motors of the machine 10. The controller 52 also takes part in controlling the tool change operation, which will be described hereinafter, and the related operation of the tracing milling machine 10 according to the present invention. The tracing milling machine 10 is also provided with an automatic tool changer portion 40 which is mounted on the side of the vertical machine body 11 and a tool change controller 53 for controlling the tool changing operation of the automatic tool changer portion 40. The tool change controller 53 is connected to the tracing milling machine controller 52 and receives a tool change command signal from the controller 52. The tool change controller 53 generates a signal indicating a completion of the tool changer operation when the tool change operation of the automatic tool changer portion 40 is completed, and sends the completion signal back to the tracing milling machine controller 52. The automatic tool changer portion 40 has a tool magazine 41 for storing therein cutting tools $T_o$ through $T_n$. The tool magazine 41 is constructed so as to be rotatable about a horizontal axis, and is provided with a transfer means for effecting a transfer of one of the cutting tools $T_o$ through $T_n$, for example a cutting tool $T_n$, from the storing position within the magazine 41 to a tool changing position. The cutting tool $T_n$, shown by the dotted lines in FIG. 1, is positioned at the tool changing position, while the cutting tool $T_n$, shown by the solid lines, is positioned at the storing position within the tool magazine 41. On the other hand, when a used cutting tool attached to the spindle 12, for example a cutting tool $T_o$, should be replaced by a fresh cutting tool, the used cutting tool $T_o$ is moved from the cutting position thereof to a tool changing position. The cutting tool $T_o$, shown by the solid lines in FIG. 1, is positioned at the tool changing position. A conventional tool changing arm 42 is provided for effecting the replacement of the used cutting tool $T_o$ by the fresh cutting tool $T_n$. Therefore, the tool changing arm 42 has, on its both ends, conventional tool gripping pawls, and is capable of rotating about a vertical axis as well as capable of moving up and down. As a result, when the tool gripping pawls grip both tools $T_o$ and $T_n$ and when the pawls move downwardly, the used cutting tool $T_o$ can be withdrawn from the spindle 12 and the fresh cutting tool $T_n$ can be withdrawn from the tool magazine 41. Thereafter, the tool changing arm 42 is rotated through 180 degrees, and then, the arm 42 is moved upwardly so that the fresh cutting tool $T_n$ is attached to the spindle 12 and so that the used cutting tool $T_o$ is returned to the storing position of the tool magazine 41. Thus, the tool changing operation is completed.

The above-described tool changing operation is started in the same way as in the case of the conventional machining center with an automatic tool changer. That is, when the used cutting tool $T_o$, attached to the spindle 12, should be replaced with a fresh cutting tool $T_n$, the tool changing controller 53 sends a signal indicating the starting of the tool changing operation to the automatic tool changer portion 40. On the other hand, when the tool changing operation is completed, the automatic tool changer portion 40 sends a signal indicating the completion of the tool changing operation to the tool changing controller 53. Therefore, as described previously, the tool changing controller 53 sends the completion signal of the tool changing operation to the tracing milling machine controller 52.

In the present invention, the time when a used cutting tool should be changed to a fresh cutting tool is set by a tool changing time controller 54, which is capable of issuing a signal indicating that the tool changing time of the used cutting tool has arrived. The tool changing time controller 54 is connected to the tracing milling machine controller 52. The tool changing time controller 54 may be of the type which includes therein a timer device capable of counting the total operational time of each of the cutting tools $T_o$ through $T_n$ stored in the tool magazine 41 and, also, capable of issuing a signal when the total operational time of each cutting tool from the initiation of the cutting operation reaches a predetermined amount of time. The tool changing time controller 54 may also be of the type which is capable of issuing a signal of the tool changing time of each of the cutting tools $T_o$ through $T_n$ when each of the cutting tools is worn to a predetermined limit during the cutting operation, or when each of the cutting tools is broken during the cutting operation. At each tool changing time, the spindle 12 is moved upwardly to the tool changing position. The upward movement of the spindle 12 is caused by the upward movement of the spindle head 23 and the arm 24 by means of the drive motor 22. On the other hand, when the tracing milling machine controller 52 receives the signal of the completion of the tool changing operation from the tool changing controller 53, the controller 53 operates the drive motor 22 to cause the downward movement of the spindle head 23 and the arm 24. Therefore, the spindle 12 and the quill 13 are moved downwardly and brought to the cutting operation position. Further, the downward movement of the arm 24 enables the tracer 31 of the tracer portion 30 to reach the tracing surface of the model M. When the spindle 12 and the quill 13 reach the cutting operation position, and when the tracer 31 reaches the tracing surface of the model M, the stepping motor 16 is operated so as to upwardly or downwardly move a cutting tool (for example, a cutting tool $T_n$) attached to the spindle 12, until the cutting tool is correctly positioned at a given position of the workpiece W, from which position the cutting operation by the cutting tool $T_n$ should be initiated. After this correct positioning of the cutting tool is completed, the tracing milling machine controller 52 sends a drive signal to the drive motor 14 via a controller 15. As a result, the spindle 12 is rotated by the drive motor 14. Thus, the cutting operation of the cutting tool $T_n$ attached to the spindle 12 is started. However, as one important feature of the present invention, the tracing milling machine 10 is provided with a capability by which the machine 10 can perform an automatic adjustment of the positional relationship between the tracer 31 and the fresh cutting tool $T_n$ attached to the spindle 12 before the cutting operation of the cutting tool $T_n$ is started. That is, with the tracing milling machine 10, if the positional relationship between the tracer 31 and the fresh cutting tool $T_n$ is varied from that between the tracer 31 and the previously used cutting tool (for example, a cutting tool $T_o$), due to the change of these tools, a compensation operation for the variation in the positional relationship is automatically performed. As a result, a predetermined positional relationship between the tracer 31 and a cutting tool attached to the spindle 12 can be re-established every time the tool changing operation is carried out. In other words, the predetermined positional relationship between the tracer 31 and a cutting tool attached to the spindle 12 is always retained during the entire course of cutting process of the workpiece W. Therefore, in response to the tracing movement of the tracer 31 over the tracing surface of the model M, the workpiece W is shaped so as to eventually correspond to the shape of the model M, even if a tool changing is carried out during the cutting process of the workpiece W.

In order to achieve the above-mentioned automatic adjustment of the positional relationship between the tracer 31 and a cutting tool attached to the spindle 12, in the present invention, the workpiece W and the model M mounted on the work table 17 are respectively provided with reference planes, which reference planes are formed before the mounting of the workpiece W and the model M onto the work table 17. Therefore, when the workpiece W and the model M are fixedly mounted on the work table 17, a fixed positional relationship is established between the reference plane of the workpiece W and the reference plane of the model M. This fixed positional relationship is used for establishing a predetermined positional relationship between a cutting tool attached to the spindle 12 and the tracer 31. That is, when the automatic adjustment of the positional relationship should be performed, a cutting tool attached to the spindle 12 is brought into contact with the reference plane of the workpiece W, and simultaneously the tracer 31 is brought into contact with the reference plane of the model M until both the cutting tool and the tracer 31 contact respective reference planes in an equal contact state. For the purpose of detecting this equal contact state, contact detectors 27 and 28 are respectively attached to the workpiece W and the model M. These contact detectors 27 and 28 are connected to a common contact detecting device 26, which is connected to the tracing milling machine controller 52. The contact detector 27 sends a contact detecting signal to the device 26 when the detector 27 detects that the cutting tool contacts the reference plane of the workpiece W. Similarly, the contact detector 28 sends a contact detecting signal to the device 26 when the detector 28 detects that the tracer 31 contacts the reference plane of the model M. The contact detecting device 26 sends a detecting output signal to the tracing milling machine controller 52 when the device 26 receives both of the contact detecting signals from the detectors 27 and 28. The detectors 27 and 28 may consist of a conventional electric resistance type detector, respectively, which operates so as to close an electric circuit and to issue an electric ON signal of a given magnitude when the cutting tool contacts the workpiece W or when the tracer 31 contacts the model M. The detectors 27 and 28 may consist of a conventional electric capacitance type detector, respectively. The contact detecting device 26 may include therein an AND circuit, so as to issue an electric output signal when both of the contact detecting signals from the detectors 27 and 28 appear at the input terminals of the AND circuit. Further, the tracing milling machine 10 is provided with a tool data setting device 55, which is connected to the tracing milling machine controller 52. In the tool data setting device 55, an allowable amount of displacement of the tracer 31 for every cutting tool ($T_o$ through $T_n$) attached to the spindle 12 is preliminarily set before the starting of the operation of the tracing milling machine 10. Therefore, after the tool changing operation, the spindle 12 and the tracer 31 are quickly moved toward the workpiece W and the model M until the tracer 31 contacts the model M and is displaced the allowable amount of displacement. When the detectors detect that the above-mentioned equal contact state of the cutting tool and the tracer 31 is achieved, the positional relationship between the cutting tool and the tracer 31 is equal to the fixed positional relationship between the reference planes of the workpiece W and the model M. This means that an adjustment has been accomplished so that the positional relationship between the cutting tool and the tracer 31 has been brought into a predetermined positional relationship. Thus, after completion of this adjustment, the tracing cutting operation of the machine 10 is started.

The operation of the tracing milling machine 10 for adjusting the positional relationship between a cutting tool attached to the spindle 12 and the tracer 31, which operation is performed everytime the tool changing operation is performed, will now be described in more detail with reference to FIGS. 1 and 2.

Figure 2:
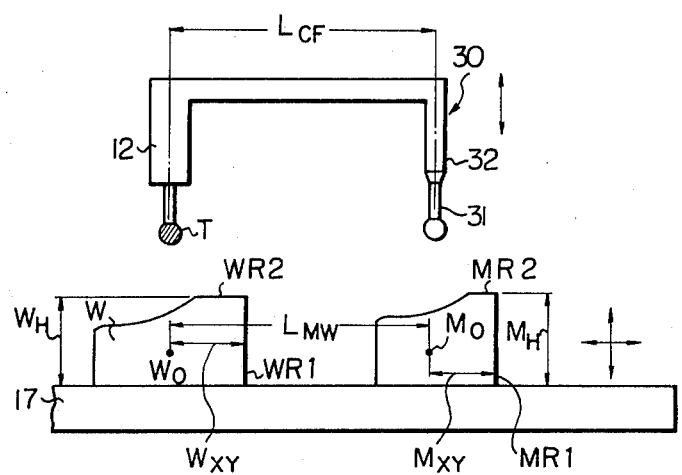
FIG. 2 is a schematic front view illustrating first and second reference planes used for a particular operation of the tracing milling machine of FIG. 1.

As indicated in FIG. 2, the model M and the workpiece W mounted on the work table 17 have first reference planes MR1 and WR1, respectively, and second reference planes MR2 and WR2, respectively. Further, a horizontal straight line distance $L_{CF}$ between the axis of the cutting tool attached to the spindle 12 and the axis of the tracer 31 of the tracer portion 30 is initially set so as to be equal to a horizontal straight line distance $L_{MW}$ between the center $M_O$ of the model M and the center $W_O$ of the workpiece W. Preferably, the height $W_H$ of the second reference plane WR2 of the workpiece W from the top of the work table 17 is set so as to be equal to the height $M_H$ of the second reference plane MR2 of the model M. Further, preferably, a horizontal straight line distance $W_{XY}$ between the first reference plane MR1 of the workpiece W and the center $W_O$ is set so as to be equal to a horizontal straight line distance $M_{XY}$ between the first reference plane MR1 of the model M and the center $M_O$. With the above-mentioned first and second reference planes of the workpiece W and the model M, horizontal and vertical adjustments, of the positional relationship between the cutting tool T attached to the spindle 12 and the tracer 31 of the tracer portion 30 are performed as follows.

Firstly, when the tracing milling machine controller 52 receives the signal indicating the completion of the tool changing operation from the tool changing controller 53 the controller 52 sends a command signal indicating the starting of the operation for adjusting the positional relationship between the cutting tool T and the tracer 31 to the tracing controller 51. At this moment, the controller 52 reads out the above-mentioned allowable amount of the displacement of the tracer 31 from the tool data setting device 55, and supplies the read out allowable amount to the tracing controller 51. Thereafter, the controller 52 causes the horizontal movement of the work table 17, via the controller 51 and the drive motor assembly 18, so that the spindle 12 and the tracer 31 approach the workpiece W and the model M mounted on the work table 17, respectively. The movement of the work table 17 is continued by the operation of the drive motor assembly 18 until the tracer 31 contacts the first reference plane MR1 and the cutting tool of the spindle 12 contacts the first reference plane WR1. It should here be noted that, during this contacting operation of the tracer 31 and the cutting tool, the contacting of the tracer 31 with the first reference plane MR1 always precedes the contacting of the cutting tool T with the first reference plane WR1. It should further be noted that during the contacting operation, the work table 17 is quickly moved by the drive motor assembly 18 until the tracer 31 contacts the first reference plane MR1 and until the tracer 31 is displaced to the allowable amount of displacement set by the tool data setting device 55. After the tracer 31 is displaced to the allowable amount of displacement, the work table 17 is moved at a relatively slow speed until the cutting tool contacts the first reference plane WR1. It should be noted that from the contacting of the tracer 31 with the first reference plane MR1 to the contacting of the cutting tool with the first reference plane WR1, the displacement of the tracer 31 is increased from the above-mentioned allowable amount of displacement set by the tool data setting device 55. Thus, when the cutting tool contacts the first reference plane WR1, the displacement amount of the tracer 31 reaches a given value larger than the allowable amount of displacement set by the device 55. When ON signals from both of the detectors 27 and 28 are supplied to the device 26 and, subsequently, when a contact detecting output signal is sent from the device 26 to the tracing milling machine controller 52, the controller 52 sends a signal indicating that the horizontal adjustment operation should be stopped, to the tracing controller 51. As a result, the horizontal movement of the work table 17 is stopped, and the horizontal adjustment operation is completed. At this stage, the above-mentioned given value of the displacement of the tracer 31 is stored in the controller 51 as an established reference displacement ($E_O$) of the tracer 31 to be used as a servo reference value.

Subsequently, the vertical adjustment operation of the cutting tool T and the tracer 31 is initiated. Initially, the tracing milling machine controller 52 operates the drive motor 22 so that the upward movement of the spindle head 23 and the arm 24 are caused. As a result, the cutting tool T attached to the spindle 12 and the tracer 31 moves away from the workpiece W and the model M. This upward movement of the spindle head 23 and the arm 24 is continued until the signals from the detectors 27 and 28 become OFF. After completion of this upward movement, the controller 52 reads out an allowable amount of displacement of the tracer 31 in the vertical Z-axis direction from the tool data setting device 55 and sets the read out value in the tracing controller 51. Thereafter, the controller 52 causes, via the controller 51, the operation of the drive motor assembly 18 so that the work table 17 moves upwardly until the tracer 31 contacts the second reference plane MR2 of the model M and until the allowable amount of displacement of the tracer 31 is caused. During this upward movement of the work table 17, if both the signals from the detectors 27 and 28 become ON, the contact detecting device 26 issues a contact detecting output signal, and this output signal is sent to the controller 52.

As a result, the controller 52 immediately stops the upward movement of the work table 17, thereby completing the vertical adjustment of the positional relationship between the cutting tool T and the tracer 31. On the other hand, during the upward movement of the work table 17, if the contact detecting device 26 issues no contact detecting output signal until the tracer 31 contacts the second reference plane MR2 and until the tracer 31 is displaced the allowable amount of vertical displacement thereof, the upward movement of the work table 17 is stopped immediately when the vertical displacement of the tracer 31 reaches said allowable amount set by the tool data setting device 55. Subsequently, the tracing milling machine controller 52 operates the stepping motor 16 so that the spindle 12 and the quill 13 are gradually moved downwardly until the cutting tool T attached to the spindle 12 contact the second reference plane WR2 of the workpiece W. Thus, when the cutting tool T contacts the second reference plane WR2, the signals from both of the detectors 27 and 28 become ON. As a result, the device 26 issues a contact detecting output signal to the controller 52. Consequently, the controller 52 stops the operation of the stepping motor 16. Accordingly, the downward movement of the spindle 12 and the quill 13 is stopped, and the vertical adjustment of the positional relationship between the cutting tool T and the tracer 31 is completed.

When the horizontal and vertical adjustments of the positional relationship between the cutting tool T attached to the spindle 12 and the tracer 31 are both completed in the manner described above, the controller 52 generates a signal indicating the starting of the tracing cutting operation. Thus, the cutting operation of the cutting tool T attached to the spindle 12 is started.

From the foregoing description, it will be understood that the tracing milling machine with an automatic tool changer, according to the present invention, is capable of operating so as to establish a predetermined positional relationship between a cutting tool attached to the spindle of the machine and the tracer for tracing the model every time the tool changing operation of the automatic tool changer is carried out. This fact means that the tracing milling machine with an automatic tool changer, according to the present invention, is capable of performing the tracing milling of a metal product having a complicated shape, such as a male or female metal mold, at a high production efficiency and with a high production accuracy. Further, the foregoing description relates to only a typical embodiment of the present invention and, therefore, the present invention may adopt other embodiments. For example, provision of reference planes for a workpiece and a model, may be replaced with such a method that conventional gauge devices used in a machine shop are utilized for establishing reference planes with which a cutting tool and the tracer are contacted when the adjusting operation of the positional relationship between the cutting tool and the tracer is performed after the tool changing operation.

Figure 3:
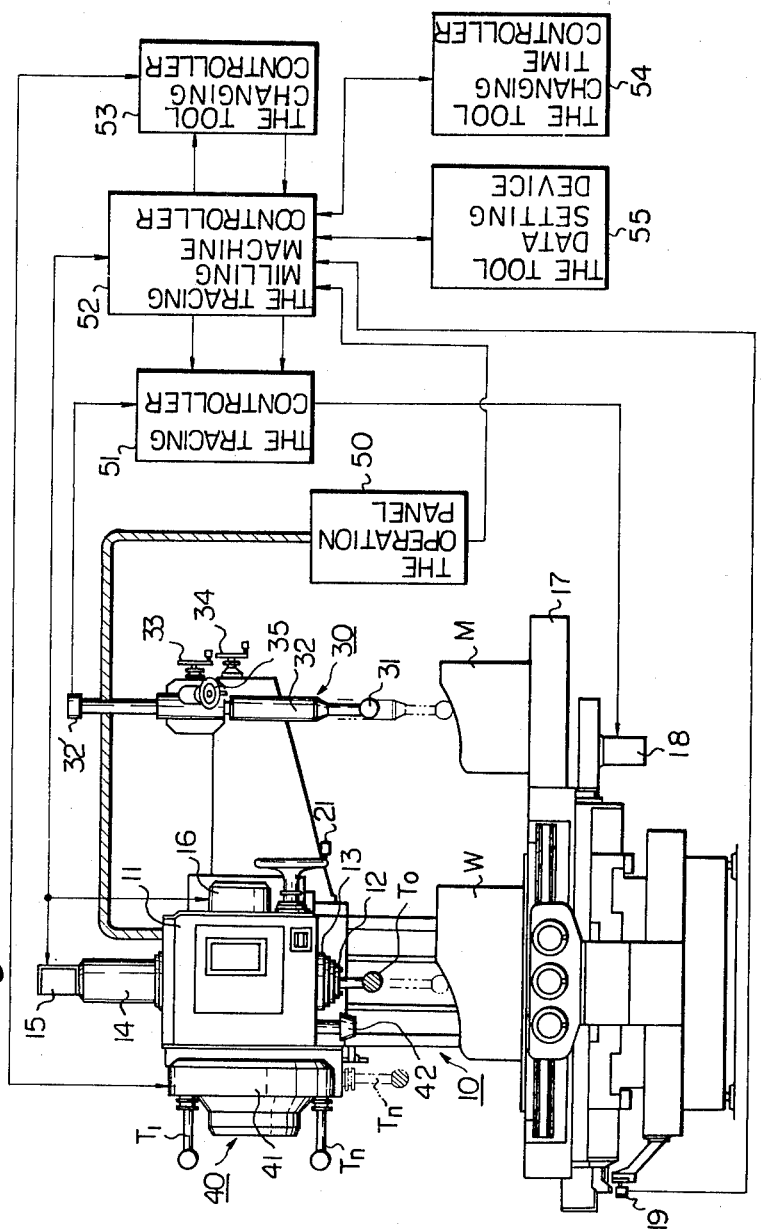
FIG. 3 is a schematic block diagram of a tracing milling machine with an automatic tool changer, according to another embodiment of the present invention.

Referring now to FIG. 3, which illustrates a tracing milling machine with an automatic tool changer, according to another embodiment of the present invention, the same or like elements or portions as those of the machine of FIG. 1 are designated by the same reference numerals. Therefore, a description will now be provided with respect to the particular operation of the machine of FIG. 3 for adjusting the positional relationship between a cutting tool attached to the spindle 12 and the tracer 31 of the tracer portion 30, which operation is performed whenever the tool changing operation of the automatic tool changer portion 40 is completed. However, it should be noted that in the tracing milling machine 10 of FIG. 3, the tracer 31 has, at its end, a spherical shaped stylus, and moreover, all cutting tools $T_o$ through $T_n$ are spherical shaped cutters respectively having a radius approximately equal to the radius of the spherical stylus of the tracer 31.

To begin with, in the tracing milling machine of the embodiment of FIG. 3, the tracer 31 of the tracer portion 30 moves over the model M so as to trace the three-dimensional shape of the model M. In response to the tracing movement of the tracer 31, three-dimensional movement of the work table 17, that is, the movement of the work table 17 in X-axis, Y-axis and Z-axis directions, is servocontrolled by means of the tracing controller 51. During this movement of the work table 17, the workpiece W mounted on the work table 17 is machined by a cutting tool attached to the spindle 12. As a result, the workpiece W is shaped as a product having the same shape as, or a shape similar to that of, the model M. Therefore, the positional relationship between a cutting tool and the tracer 31 must always be kept constant during the entire course of the tracing milling operation of the machine, even if the cutting tool attached to the spindle 12 is replaced by a fresh cutting tool supplied from the automatic tool changer portion 40. However, the tool dimensions, that is, the tool radii and the tool lengths of all the tools $T_o$ through $T_n$ are different from one another. Therefore, whenever a cutting tool attached to the spindle 12 is replaced by another cutting tool, an appropriate adjustment must be carried out for establishing a predetermined positional relationship between every cutting tool attached to the spindle 12 and the tracer 31. In order to achieve the adjustment, the machine of FIG. 3 can perform the particular adjusting operation as described hereinbelow.

In order to carry out the particular adjusting operation, in the tool data setting device 55, an adjustment amount of the reference displacement $E_o$ of the tracer 31 with respect to each individual cutting tool of the tools ($T_o$ through $T_n$) is set and stored. The setting of the adjustment amount of the reference displacement $E_o$ is achieved by, for example, conventional electric volume devices provided for the device 51. When the tracing milling machine controller 52 is supplied with a signal of a tool changing time from the tool changing time controller 54, the controller 52 supplies to the tool changing controller 53 a command signal indicative of the starting of the tool changing operation, and also the controller 52 reads out of the device 55 the adjustment amount of the reference displacement $E_{oa}$ for the fresh cutting tool, which should be freshly attached to the spindle 12 in place of the used cutting tool (for example, a fresh cutting tool $T_n$ in the case where the used tool $T_o$ is replaced by the tool $T_n$). The adjustment amount of the reference displacement $E_o$ of the tracer 31 is set in the tracing controller 51 by means of the controller 52. Therefore, in the tracing controller 51, an adjusted reference displacement of the tracer 31 is established, so that the servo control of the tracing cutting operation of the fresh cutting tool is conducted by the controller 51 with respect to the established reference displacement of the tracer 31. As a result, a change in the positional relationship between a cutting tool attached to the spindle 12 and the tracer 31, which is caused due to the difference between the tool radius of the used cutting tool (for example $T_o$) and the tool radius of the fresh cutting tool (for example $T_n$), can be cancelled. For enabling the setting of each adjustment amount of the reference displacement $E_o$ of the tracer 31 in the tracing controller 51, the tracing milling machine controller 52 includes therein circuit means comprised of A-D converters and D-A converters, and also, the tracing controller 51 includes therein conventional reference displacement setting circuits. In the above-mentioned tool data setting device 55, a tool length adjustment datum for each individual cutting tool of the tools $T_o$ through $T_n$ may be set and stored. That is, each tool length adjustment datum stored in the device 55 can be used for establishing a predetermined vertical positional relationship between each cutting tool attached to the spindle 12 and the tracer 31. Whenever the tool changing operation is carried out, the tracing milling machine controller 52 reads out of the device 55 a tool length adjustment datum for a fresh cutting tool (for example $T_n$) attached to the spindle 12, and according to this read out datum, the controller 52 generates an appropriate amount of pulses to be supplied to the stepping motor 16. As a result, the stepping motor 16 moves the spindle 12 in the vertical direction until the adjustment of the vertical positional relationship between the fresh cutting tool and the tracer 31 is achieved. Of course, the method of moving the spindle 12 may be replaced with the method of moving the tracer head 32 in the vertical direction by means of an appropriate stepping motor connected to the tracer head 32 via a suitable feed mechanism.

From the foregoing description of the embodiments of the present invention, it will be understood that the tracing milling machine with an automatic tool changer, according to the present invention, is capable of accomplishing not only the tool changing operation but, also, the operation for establishing a predetermined positional relationship between a cutting tool and the tracer for tracing the model whenever the tool changing operation is carried out. As a result, in the case of the tracing milling of a product having a very complicated shape, such as a male or female metal mold, the positional relationship between a cutting tool attached to the spindle of the machine and the tracer of the machine is always kept constant during the entire course of the tracing milling operation. Therefore, the tracing milling of the product having a very complicated shape can be performed at a high production efficiency and with a high accuracy.

What is claimed is:

1. A tracing milling machine for duplicating a shape of a model on a workpiece comprising:
   a vertical spindle head having a rotatable spindle effective to removably hold a cutting tool;
   a tracer portion having a tracer head and a tracer capable of performing a tracing movement over the model;
   a work table having a mounting surface on which the model and the workpiece to be machined are fixedly mounted;
   means for controlling a servo movement of said work table in vertical and horizontal directions;
   an automatic tool changing means for automatically replacing said cutting tool with another cutting tool;

means for defining a predetermined positional relationship between said another cutting tool and said tracer; and means for automatically establishing said predetermined positional relationship whenever said automatic tool changing means completes its replacement of said cutting tool.

2. A tracing milling machine according to claim 1, wherein said means for defining includes at least a first reference plane for said workpiece and a second reference plane for said model, said first and second reference planes being fixedly mounted on said work table, said first reference plane being contacted by said tracer and said second reference plane being contacted by said cutting tool while said tracer and said cutting tool simultaneously approach said model and said workpiece, and wherein said means for automatically establishing includes means for detecting the contacting of said tracer and said cutting tool with said first and second reference planes, respectively, and means for stopping the approaching movement of said tracer and said cutting tool in response to detection by said means for detecting.

3. A tracing milling machine according to claim 2, wherein said means for defining includes first and second reference planes for said model and third and fourth reference planes for said workpiece, said first and third reference planes being contacted by said tracer and said cutting tool, respectively, while said tracer and said cutting tool approach said model and said workpiece from a first direction, and said second and fourth reference planes being contacted by said tracer and said cutting tool, respectively, while said tracer and said cutting tool approach said model and said workpiece from a second direction orthogonal to said first direction.

4. A tracing milling machine according to claim 1, wherein said means for automatically establishing includes means for adjusting an amount of a reference displacement of said tracer with respect to each of a plurality of cutting tools when each of said cutting tools is attached to said spindle for replacement of a previously used cutting tool in said spindle.

5. A tracing milling machine according to claim 1, wherein said means for automatically establishing further includes means for adjusting a length of each of said plurality of cutting tools with respect to a length of said tracer when each of said cutting tools is attached to said spindle for replacement of said previously used cutting tool in said spindle.

6. A tracing milling machine according to claim 1, wherein said means for automatically establishing further includes a first means for adjusting an amount of a reference displacement of said tracer with respect to each of a plurality of cutting tools when said each of said cutting tools is attached to said spindle for replacement of a previously used cutting tool in said spindle and a second means for adjusting a length of each of said plurality of cutting tools with respect to a length of said tracer when each of said cutting tools is attached to said spindle for replacement of said previously used cutting tool in said spindle.

7. A tracing milling machine according to any one of the preceding claims 4 through 6, further comprising a reference displacement setting means for setting each individual reference displacement of said tracer with respect to each of said plurality of cutting tools wherever each of said plurality of cutting tools is attached to said spindle for replacement of a previously used cutting tool.

8. A tracing milling machine according to claim 5, wherein said means for adjusting a length includes means for gradually moving said spindle in a vertical direction.

9. A tracing milling machine according to claim 5, wherein said means for adjusting a length includes means for gradually moving said tracer in a vertical direction.

10. A tracing milling machine for duplicating a shape of a model in a workpiece comprising:

a work table;

means for controlling motion of said work table in at least first and second orthogonal directions;

said model and said workpiece being rigidly affixed in predetermined positional relationships on said work table;

a tracer operative to contact the surface of said model whose shape is to be duplicated;

said tracer having means for permitting displacement thereof in said second direction;

means in said tracer for producing a signal proportional to an amount of said displacement relative to a predetermined displacement;

a spindle operative to hold one of a plurality of cutting tools in a corresponding positional relationship to said tracer;

means for displacing said cutting tool in said second direction in proportion to said signal;

automatic means for replacing said one of a plurality of cutting tools in said spindle with another of a plurality of cutting tools;

automatic alignment means for aligning said another of a plurality of cutting tools with said tracer prior to using said another of a plurality of cutting tools for duplicating said shape.

11. A tracing milling machine according to claim 10, wherein said automatic alignment means includes:

at least first and second parallel reference planes affixed to said table;

means for moving said work table to a position wherein said tracer is displaced in said second direction by said first reference plane an amount equal to said predetermined displacement; and means for displacing said cutting tool in said second direction until it touches said second reference plane and for thereafter locking said cutting tool in the position attained.

12. A tracing milling machine according to claim 11, wherein said at least first and second reference planes are located on said model and said workpiece, respectively.

13. A tracing milling machine according to claim 11, further including third and fourth reference planes, said third reference plane being orthogonal to said first reference plane, and said fourth reference plane being orthogonal to said second reference plane.

14. A tracing milling machine according to claim 13, wherein said automatic alignment means includes:

means for moving said work table to a position wherein said tracer and said cutting tool are simultaneously in contact with said fourth and third reference planes, respectively, and for storing a deflection of said tracer necessary for achieving such simultaneous contact; and means for using said deflection as an offset during machining with said another of a plurality of cutting tools.

15. A tracing milling machine according to claim 10, wherein said automatic alignment means includes:
means for storing at least one dimensional characteristic of each of said plurality of cutting tools; and
means for adjusting said spindle in said second direction in response to the stored dimensional characteristic of said another of a plurality of cutting tools and for thereafter locking said spindle in the position attained by the adjustment thereof whereby said cutting tool is locked in a position which compensates for said at least one dimensional characteristic.

* * * * *